Patented Oct. 20, 1942

2,299,483

UNITED STATES PATENT OFFICE 2,299,483

PROCESS OF BUILDING UP CHROMIUM AND CHROMIUM ALLOYS AND FOR PREPARING ELECTRODES THEREFOR

Heinrich Friedrich August Lübbe and Erich Kruppa, Berlin, Germany; vested in the Alien Property Custodian No Drawing. Application August 16, 1939, Serial No. 290,494. In Germany August 18, 1938

4 Claims. (Cl. 219—8)

The present invention relates to a process of building up chromium, chromium compounds and chromium alloys, electrodes and welding rods for carrying out said process and process for preparing said electrodes and welding rods.

It has already been proposed to enhance the resistance to chemical, thermal and mechanical strain of surfaces of metal work pieces by diffusion of chromium. By the formation of mixed crystals the chromium is closely and intimately connected with the base metal, but the said diffusion requires a long time and the application of high temperatures.

It is, furthermore, known to coat metallic articles with a layer of hard chromium by electrolysis. In this process the thickness of the layer to be applied on the article increases only very slowly; a layer of about 1 mm. thickness is obtained on application of a current density of about 60 amperes per square decimeter after about 20 hours. With articles subjected to a high mechanical and thermal strain the adhesion of electrolytically produced coatings of chromium is small. Frequently the layer cracks or bursts off.

Now, we have found that, in contradistinction to the practical experiences and scientific observations hitherto made, a layer or coating of chromium may be applied to articles of any desired kind, particularly to articles made from steel and iron, in a very economical manner by welding it thereon. In this case it is necessary to protect the weld by surrounding it with a gas, especially hydrogen, since without the application of such a protective means the chromium immediately oxidizes on being heated. The welding process is preferably performed with the electric arc.

A material simplification of the process according to the present invention has been made possible by the fact, verified by experiments, that the hydrogen occluded in the electrolytic chromium escapes on heating and forms an extraordinarily effective protective gas cover during the welding operation. In the preparation of electrolytic chromium it is easily possible by application of high bath temperatures and a high current density to include gaseous hydrogen in the chromium until saturation occurs.

As a further improvement of the present invention it is, therefore, proposed to use as additional welding material or as welding electrodes chromium having a high content of hydrogen, especially electrolytic chromium.

It is also possible that, in the case of layers resistant to wear, the main part of the layer is, for reasons of economy, welded on the article and finally a thin layer of chromium is electrolytically applied thereon.

Instead of using pure chromium there may likewise be used chromium alloys or chromium compounds for applying layers by welding. In these cases very hard coatings are advantageously obtained by melting electrodes of chromium or of a chromium alloy by means of the electric arc in the presence of a gaseous compound of a metalloid and then applying them on the articles by welding.

Chromium alloys possessing after the application by welding without any thermal after-treatment a great hardness, for the most part consist of chromium with additions of heavy metals or light metals or the compounds thereof. There are many possibilities for producing welding electrodes of an alloy or a metal mixture substantially containing chromium; some of these possibilities may be named as follows:

(a) 60 per cent Cr, 35 per cent W, 5 per cent Mn.
(b) 50 per cent Cr, 25 per cent W, 10 per cent Mo, 15 per cent Co.
(c) 70 per cent Cr, 5 per cent W, 25 per cent Fe.
(d) 60 per cent Cr, 30 per cent WC, 10 per cent Co.
(e) 95 per cent Cr, 3 per cent Al, 2 per cent Si.
(f) 98 per cent Cr, 2 per cent Be.

Metal coatings produced according to the present invention from chromium compounds are obtained on melting a chromium electrode in the presence of a gaseous compound of a metalloid. The transformation of the chromium into the chromium alloy desired in each case is effected by selecting a suitable gaseous compound; thus, for instance, chromium nitrite is formed with application of ammonia, chromium boride with boron hydride, chromium silicide with silicon hydride (silane), chromium carbide with hydrocarbons, chromium phosphide with hydrogen phosphide.

A special feature of the present invention consists in the formation in the outer zone of the metal coating of a layer containing the chromium compound in a particularly high concentration, the action of the gas current being continued after the welding process is complete until the whole has cooled down.

The gaseous compounds of metalloids dissociate by the action of the electric arc; isolation of the metalloid atoms occurs simultaneously. In this state the metalloid atoms are extraordinarily reactive. This fact may explain the formation of chromium alloys having valuable properties with regard to pure chromium in spite of the fact that the chromium or the alloys containing for the most part chromium are in the fused state only for a short time during the welding process. It is not at all necessary that the entire amount of metal applied by welding be entirely converted into the coresponding new compound. It is sufficient that only part of the metal is converted in order to attain a greater hardness of the metal layer.

The welding electrodes may be made by fusing or casting or, from finely pulverized chromium or from the corresponding metal mixtures, by pressing and sintering.

The welding electrodes necessary for performing the process of the production of metal layers consisting of chromium compounds may also be produced in an economical way from electrolytic chromium by causing them electrolytically to deposit in a suitable form on a cathode obtained from an alloy having a base of bismuth, for instance wood metal, if necessary by partly covering the cathode with an insulating means. When the electrolysis is finished, it is sufficient to place the bismuth cathode carrying the chromium electrode into boiling water or hot oil for the purpose of melting off the carrier metal from the electrode and to enable the removing of the finished chromium electrode.

It is likewise possible according to the present invention to weld chromium alloys. For this purpose there is, for instance, used a rod composed of the components of the alloy, said rod being charged with an amount of hydrogen sufficient for the formation of a protective gaseous layer during the welding. Alternatively, the respective additional metals may be mounted in a hollow chromium rod charged with hydrogen. The fusing drop formed at the end of the rod where the melting off takes place combines the melted chromium of the tube with the addition metal of the core so as to form an alloy which, after the welding, is intimately connected with the article in question. The gaseous hydrogen contained in the chromium tube is set free by the action of the welding temperature and of the electric arc, respectively, and it surrounds the welding place with a tight protective gas envelope.

In this manner it is possible, to apply chromium alloys by welding which according to the use to which they are to be put are either tough and not very hard or tough and hard or tough and particularly hard and resistant to wear.

A tough and not very hard chromium alloy which can be worked easily is formed if the core in the chromium tube consists, for instance, of cobalt and if, for example, the tube and the core together contain 50 per cent of chromium and 50 per cent of cobalt.

Tough and hard chromium alloys are produced, if the core in the chromium tube consists of tungsten, molybdenum, titanium, tantalum, vanadian and the like, either alone or mixed with each other or with another binding metal. A suitable composition of the core is, for instance, 50 per cent of tungsten, 25 per cent of cobalt, 10 per cent of manganese, 5 per cent of silicon, 10 per cent of molybdenum. The proportion of the chromium of the tube and the alloy metals of the core may, for instance, be 1:1.

Chromium alloys of excellent hardness and a high resistance to wear are formed by melting off a chromium tube carrying a core which is composed of metal compounds, for instance, carbides, nitrides, borides and silicides. The core may likewise consist of metals containing in admixture the elements of the desired compounds, for instance carbon. The metal compounds are imbedded in the layer applied by welding in the form of micro crystals. In order to obtain by means of a chromium alloy a layer which is not only very hard but also tough, it is suitable to admix to the core a metal of the iron group, for instance iron, nickel or cobalt.

It is most suitable to fill or press finely pulverized metals into the chromium tube. These finely pulverized metals may also be mixed with a binding agent, for instance water-glass or the like, said binding agent being able to act in the welding process also as a deoxidizing agent.

Alternatively, a drawn wire or a cast rod or a rod pressed from metal powder or, if desired, a sintered rod which consists of the desired alloy metals or metal compounds may be surrounded electrolytically with a chromium coating, if necessary, with application of a thin intermediate layer consisting, for instance, of nickel or copper. If this chromium coating is caused to form in the density desired in each particular case in a hot chromium bath with application of a high current density, the gaseous hydrogen is contained not only in the chromium coating, but on account of the diffusion also in the core metal. The drawn, cast or sintered rod of any chromium alloy may also be charged with hydrogen by heating the rod to 800° C.–1000° C. and thereupon allowing it to cool slowly in an atmosphere of hydrogen, if desired, below normal pressure.

The chromium tubes necessary for the production of the welding rods are made electrolytically on a carrier cathode and separated therefrom by its chemical dissolution. Whereas it is difficult and expensive to free a chromium rod deposited on a wire or on a rod from iron, copper or brass, it is easy to do so without considerable material loss if as carrier cathode there is used a thin-walled tube from copper or brass, for instance a capillary tube.

Another way of performing the present invention is to use a chromium tube which is not only filled with different alloy components but which is at the same time at its outer surface covered with these alloy components; the chromium tube may, alternatively, be only covered with different alloy components at its outer surface, without being filled therewith. The coating of the outer surface of a chromium rod is suitably performed by applying thereon a paste containing the alloy components desired in each case, if necessary, by employing a deoxidizing agent or a slag removing agent as basic substance. In the case of being only covered with the alloy components at its outer surface, the chromium rod may also be massive, i. e. not hollow.

The metals used as alloy components may themselves also contain occluded hydrogen; this is of particular advantage if the chromium rods have a small thickness of wall or a small diameter, so that, on welding, hydrogen is additionally set free from the components, an increased deoxidizing action takes place and a sufficient amount of protective gas is led to the electric arc.

We claim:
1. A process of producing firmly adhering metal coatings of chromium compounds resistant to wear on articles of any kind by welding which comprises melting onto the articles a chromium electrode by electric arc welding in the presence of a gaseous compound of an element selected from the class consisting of carbon, nitrogen, boron and silicon and simultaneously transforming the melted off part, wholly or partially, into a chromium compound of said element.

2. A process of producing firmly adhering metal coatings resistant to wear on articles of any kind according to claim 1 which comprises maintaining the action of said gaseous compound until the welded metal layer has cooled down.

3. Process of preparing a fusible electrode consisting of chromium for carrying out the process as claimed in claim 1 which comprises electrolytically producing a chromium electrode on a cathode of an alloy having a base of bismuth and removing said chromium electrode from the bismuth alloy by melting off the bismuth alloy in hot water or hot oil.

4. A process for producing welding rods having a core of a metal alloyable with chromium and a chromium sheath thereon which comprises electrolytically depositing chromium on a chromium cathode consisting of a thin walled capillary tube, chemically freeing the chromium tube thus produced from said capillary tube, and charging the chromium tube with said alloyable core metal.

HEINRICH FRIEDRICH AUGUST LÜBBE.
ERICH KRUPPA.